United States Patent [19]
Howard

[11] Patent Number: 5,601,431
[45] Date of Patent: Feb. 11, 1997

[54] INTERIOR DESIGN SYSTEM AND METHOD

[76] Inventor: Cheryl Howard, 10719 Ashton Ave., Los Angeles, Calif. 90024

[21] Appl. No.: 433,138

[22] Filed: May 3, 1995

[51] Int. Cl.$^6$ .................................................. G09B 25/00
[52] U.S. Cl. .............................................. 434/79; 434/80
[58] Field of Search .............................. 434/72, 75, 79, 434/80

[56] References Cited

U.S. PATENT DOCUMENTS

| | | | |
|---|---|---|---|
| 2,259,436 | 10/1941 | Conner | 434/79 |
| 2,291,207 | 7/1942 | Rider | 434/79 |
| 2,294,131 | 8/1942 | Raymond | 434/79 |
| 2,319,200 | 5/1943 | Bedell | 434/79 |
| 3,994,079 | 11/1976 | Mirman | 434/80 |
| 4,652,239 | 3/1987 | Brimberg | 434/80 |
| 4,659,409 | 4/1987 | Arafat | 434/79 |
| 4,830,619 | 5/1989 | Marion | 434/79 |
| 4,902,229 | 2/1990 | Pedersen et al. | 434/80 |
| 5,252,071 | 10/1993 | Hansard | 434/79 |

FOREIGN PATENT DOCUMENTS

| | | | |
|---|---|---|---|
| 2442443 | 3/1976 | Germany | 434/79 |
| 436601 | 10/1935 | United Kingdom | 434/79 |
| 1144235 | 3/1969 | United Kingdom | 434/79 |

OTHER PUBLICATIONS

Workbook of Image Products, Inc., P.O. Box 566125, Dallas, TX 75356, date unknown but believed to be 1993 or earlier.
Catalog of Calhook Emerling & Company, 574 Weddell Drive #9, Sunnyvale, CA 94089, and advertisement on p. 10, date at least as early as Apr. 1994.
Advertisement for "Instant Design" Planners of H.M. Specialties, P.O. Box 1764, Sandusky, OH 44871–1764, date at least as early as 1993.
Instant Designer Kit of Design Works Inc., 11 Hitching Post Road, Amherst, MA 01002, date at least as early as 1987.

*Primary Examiner*—Paul J. Hirsch
*Attorney, Agent, or Firm*—Small Larkin & Kiddé

[57] ABSTRACT

An interior design system comprising a display assembly having three flexible transparent overlays, a plain background sheet hinged to corresponding edges of the overlays, and a template sheet hinged to a free edge of the background sheet and having "scale" background and foreground grid sections for assisting in laying out interior room decorator's designs with a comprehensive catalog of design elements printed with scale designs of perspective furniture and accessory designs, and architectural elements for creating the room space to be decorated. The catalog pages have rows of printed scale designs covered with transparent plastic, with overlying, selectively removable and replaceable design elements with designs that are printed to the same scale on carrier sheets of flexible "static-cling" material, the carrier sheets being rectangular sections that are cut from a printed sheet the same size and shape as the backing sheet. In this manner, the catalog pages provide marked storage positions for the design elements after use. In addition, the backing sheets are marked with descriptive labels and special coded symbols in distinctive shapes and colors for assisting in selection and coordination of interior designs, and also are imprinted with generic labels for the designs. The method constitutes the steps of providing the catalog of scale images and the background and foreground grid sections, labeling and coding the images for identification, coordination and storage, selecting candidate images from the catalog and transferring them to the grid sections, and applying the images in the desired positions and combinations, thereby to create a decorator's design, and optionally applying colors as an overlay on the completed design for a more complete rendering.

32 Claims, 4 Drawing Sheets

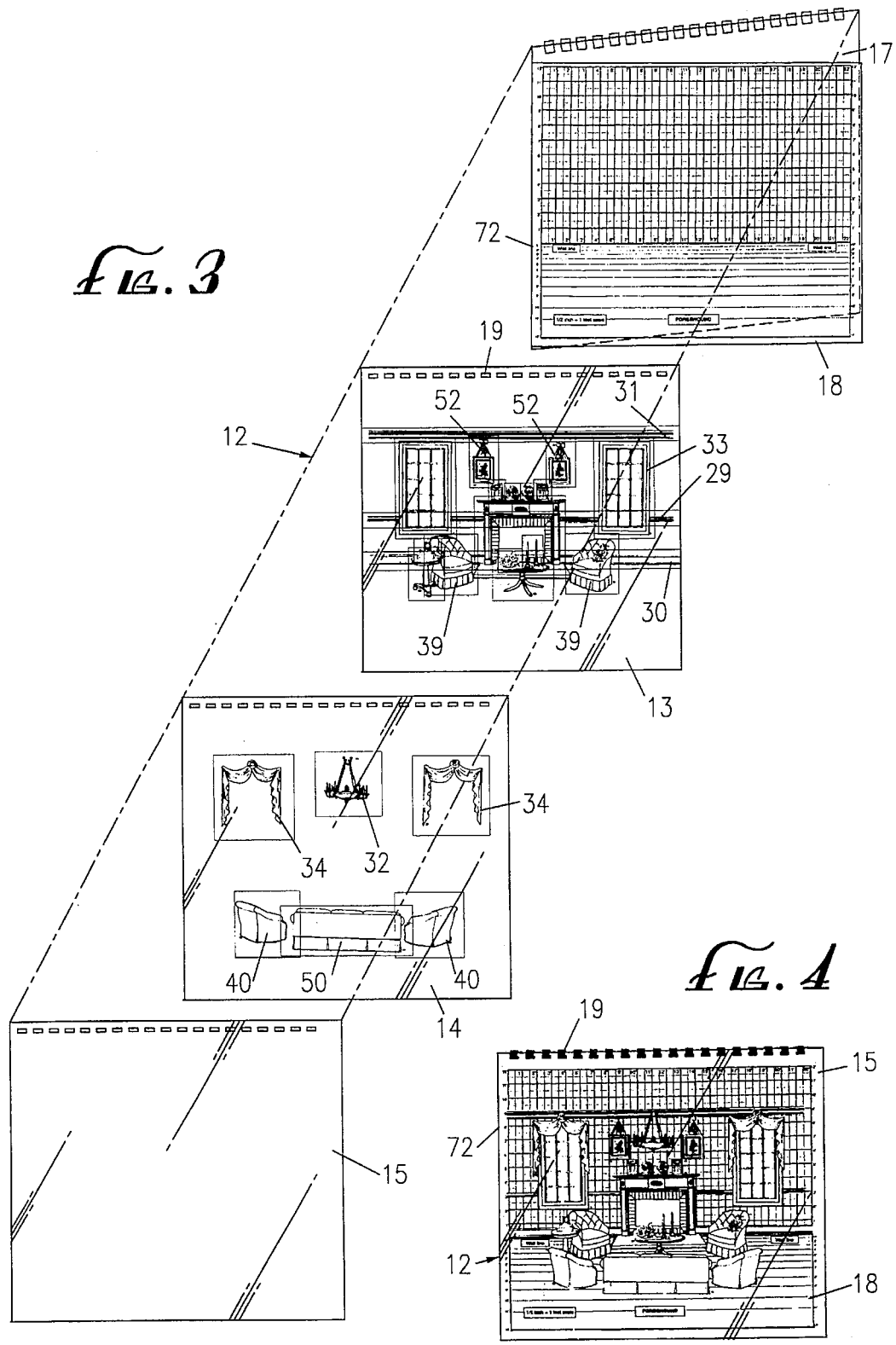

INTERIOR DESIGN SYSTEM AND METHOD

BACKGROUND OF THE INVENTION

This invention relates to interior design and decorating, and relates more particularly to a design system and method for assisting the interior designer in selecting, arranging and coordinating the elements of an interior design project.

Interior design or decoration is the art of creating and decorating an indoor space such as a residential or commercial room, and includes the selection and arrangement of furniture, wall coverings, window coverings, accessories and other design elements that make up the interior space of the room, in a manner that will harmonize with the architectural features of the room and produce an attractive appearance as well as serving the functional purposes of the room. Selection and coordination of colors and the like also are important parts of interior design.

One of the early steps in any interior design project is likely to be the creation of a floor plan—a drawing to scale of the room and its architectural elements such as doors, windows, fireplaces and the like—and the laying out of possible furniture arrangements for the room. One approach is to cut out scale representations of the furniture pieces to be used, whether old or new, and to lay the pieces on the floor plan in different possible arrangements. If new furniture and accessories are to be used, the interior designer can test different sizes, shapes and combinations to determine what will produce the best arrangement for the room.

This process can be followed by both professional and amateur or do-it-yourself designers. Professionals often take the process another step by creating an artistic rendering of a proposed design, or even of several alternative designs, for projects that warrant the expense of such renderings. These renderings can show finished perspective or elevations with details of the proposed interior design, including accessories and colors. For those who have difficulty visualizing from a floor plan how a room will look, such detailed artistic renderings are very useful. The cost, however, can be substantial, particularly if more than one design plan has to be created.

In the past, there have been attempts to provide materials for assisting in this process, including pre-drawn furniture representations to scale, typically using a scale of one-half or one-quarter inch to one foot, and calibrated papers for floor plans drawn to the same scale. Such materials, however, have been relatively crude and quite limited in the range of design elements that are available. Accordingly, their use has been limited.

The general objective of this invention is to provide an improved interior design system for these general purposes that is much more effective than anything that has been available in the past, and that can be used simply and easily by both professional and amateur interior designers in creating and representing interior designs and decorations, without the difficulty and expense involved in obtaining artistic renditions.

SUMMARY OF THE INVENTION

This invention resides in a novel interior design system which provides a comprehensive, organized, labeled and coded catalog of design elements containing scale images of designs of candidate decorating items including furniture and accessories and the architectural elements for representing the room space to be decorated, and background and foreground grid sections for representing the room space and receiving selected design elements in a realistic rendering, and stores the images in easily accessible and organized fashion for reuse. Moreover, the labeling and coding of the system serve to assist and educate the amateur decorator in selecting elements for coordinated interior designs.

For these purposes, the system of the invention includes a unique design display assembly having a multi-layered display panel and a selectively usable plain background and a scale template background representing both a room wall in elevation and the foreground in perspective, and also providing for simple and easy addition of coloring to the elements of the interior design. This display assembly is combined with a comprehensive collection of individual designs of architectural elements, furniture and other items, each printed on a transparent carrier sheet and stored in a preselected position on one of a plurality of sheets or pages of such design pieces that are organized, labeled and coded in a novel manner for systematic access, use, storage and re-use. The elements are represented in perspective, where appropriate, for more realistic effect.

In the preferred embodiment of the invention shown herein for purposes of illustration, the design pieces comprise pieces of so-called "static-cling" transparent plastic film with the designs printed thereon to scale and in artistically correct form representing a wide variety of different interior design elements that may be used in a particular project. The design pieces are arranged in a plurality of rows on a plurality of pages of a design catalog, these pages preferably being rectangular sheets of relatively stiff backing material such as paper and having rows of corresponding imprints of the selected designs, to the same scale, indicating the proper positions of the designs on the pages. The face of each page is a transparent plastic sheet covered by a covering or coating for holding and releasing the transparent carrier sheets on the page.

With this arrangement, a group of selected designs, including ceiling, wall and floor line elements as well as furnishings, may be removed from the catalog pages and applied to a selected layer of the display panel, overlying the grids in selected positions in the room space there represented, thereby creating a highly realistic representation of the interior design that is the subject of the design project. The basic architectural elements typically will be applied first, to an underlying display layer to provide the representation of the room to be decorated, and the furniture and accessories typically will be applied to an overlying layer, in positions determined by the architectural elements. With professionally pre-drawn and mass-produced design elements, a highly effective representation of the interior design project may be made with a minimum of expense and effort.

With each design's position imprinted on the face of the sheet from which it came, the return of the designs to the catalog for systematic storage and eventual re-use is greatly facilitated. In addition, the catalog page number for each design preferably is printed inconspicuously on the element. As further assistance in selection and coordination of designs, particularly for non-professional designers, the imprint of each design on the backing sheet may include identifying the design's origin and style (e.g., "Country English", "Contemporary", "Spanish" and the like), and also providing useful generic designations (e.g., "2 tier wicker", "parquet top" and "wicker with glass." In addition, distinctively shaped (and preferably colored) symbols are provided as group designations for pieces that are compatible for use together. For example, the preferred embodiment uses a blue diamond symbol for "informal or country", a red circle symbol for "formal", a yellow square symbol for "contemporary" and a green star symbol for "transitional". Thus, the color-coded symbols indicate proper groupings of furniture. Further, catalog pages may be provided in functional groupings each consisting of several pages containing the available designs for a particular room, such as a living room, a dining room, a bedroom, and so forth, and all of these may be kept in a suitable binder such as a 3-ring notebook.

The novel method of the invention constitutes the steps of providing the comprehensive catalog of scale images of furniture, accessories and architectural elements and the background and foreground grids, labeling and coding the images for identification, coordination and storage, selecting candidate images from the catalog and transferring them to the grids, and applying them to the grids in the desired positions. As an optional feature, colors can be applied as an overlay for a more complete rendering, as water colors, crayon or other medium. This method may be practised in the hard copy format disclosed herein, or may be converted to electronic, computer-based form using well known data storage, retrieval and display techniques.

Other aspects and features of the invention will become apparent from the following detailed description, taken in conjunction with the accompanying drawings of the preferred embodiment.

BRIEF DESCRIPTION OF THE DRAWINGS

FIG. 3 is an exploded perspective view on a reduced scale of the display assembly of FIG. 2, showing the arrangement of design elements on different layers of the assembly and showing the template sheet in its operative position;

FIG. 4 is a plan view of the components in FIG. 3 in the assembled position;

DERAILED DESCRIPTION OF THE PREFERRED EMBODIMENT

Figure 1:
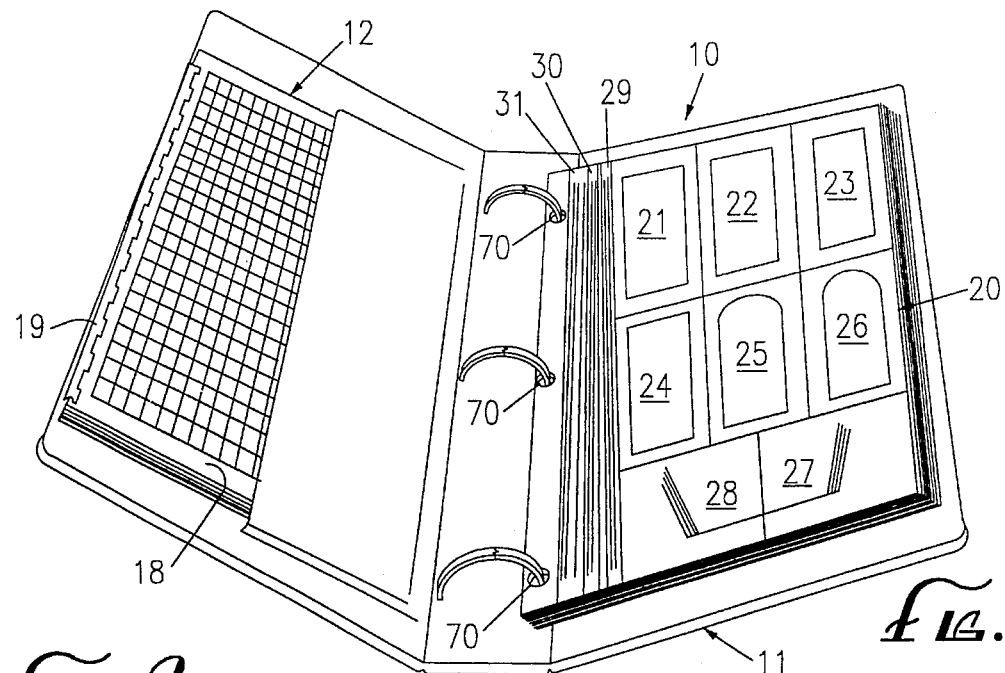
FIG. 1 is a perspective view of a notebook binder holding an interior design system in accordance with the present invention, including a display assembly and a plurality of catalog pages of design pieces, one page of architectural design elements being shown on top of the other pages.

As shown in the drawings for purposes of illustration, the invention is embodied in an interior design system, indicated generally by the reference number 10, that is assembled in a notebook binder 11 for organization and the convenience of the designer (not shown) who will use the design system. In general, the design system includes a display assembly indicated generally at 12 comprising a display panel formed by a plurality of transparent, side-by-side layers 13, 14 and 15 (FIG. 3) and two background sheets 17 and 18, the transparent layers being joined to the sheet 17 by a hinge element 19, and a catalog indicated generally at 20 and comprising a plurality of pages, each catalog page carrying a group of design elements such as those numbered 21 through 31 in FIGS. 1 and 8. The design elements in the catalog may be used in creating interior room designs, a representative design being shown in FIG. 2.

This representative design will be recognized as a living room having a ceiling bordered by a crown moulding 31 and supporting a hanging light fixture 32; two windows 33 decorated with draperies 34; a fireplace 35 and a hearth 36; a chair rail 29 and a baseboard moulding 30 on the wall; two pairs of upholstered chairs 39 and 40 and a sofa 50; and a coffee table 51. In addition, the room is accessorized with pictures 52, mantle items 53, 54, 55 and 56, and table items 57, 58 and 59.

In accordance with one aspect of the invention, using "hard copy" of the catalog, each of these design elements is printed on a transparent carrier sheet 60 (see FIGS. 3 and 5 through 9) and normally is stored in the binder 11 on one of the catalog pages 20 along with a plurality of other design elements of similar kinds. The catalog pages are made up of backing sheets 61 (FIG. 7) that are printed with the same designs as those on the design elements stored on the carrier sheets, and plastic faces 62 covering the printed backing sheets 61 and interacting with the carrier sheets 60 to secure the design elements removably in place on the catalog pages. Preferably, the carrier sheets are composed of plastic film of the type referred to as "static cling" vinyl plastic, which adheres firmly but releasably to both the faces of the catalog sheets and, when removed for use, to the layers of the display assembly 12.

Figures 5, 6:
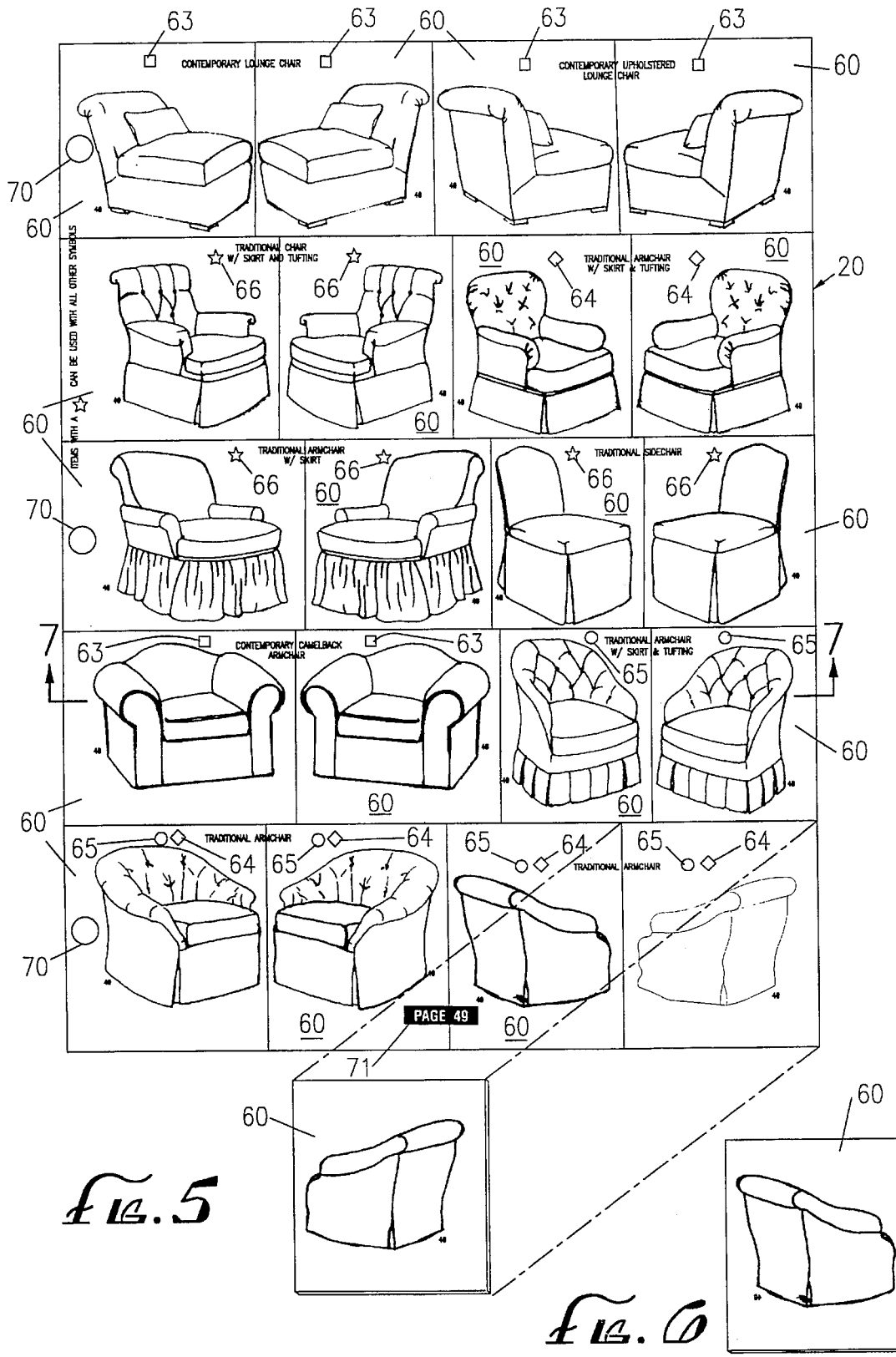
FIG. 5 is an enlarged plan view of another page of design pieces from the group of pages shown in FIG. 1, one of the design pieces being shown in exploded perspective position, as separated from the backing sheet.
FIG. 6 is a rear view of the separated design piece of FIG. 5.
Figure 7:
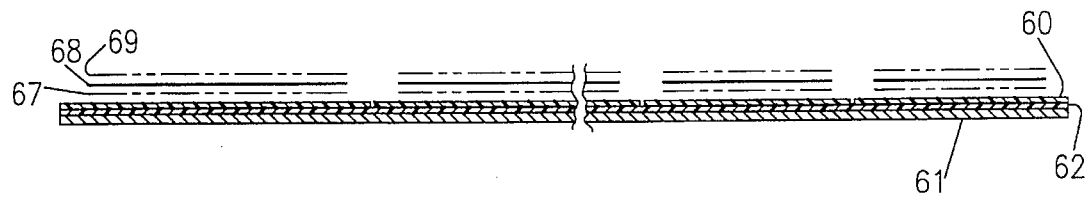
FIG. 7 is an enlarged fragmentary cross-sectional view taken along line 7—7 of FIG. 5, with a central portion removed for compactness.

As can be seen most clearly in FIGS. 5, 6 and 7, the vinyl sheet of each carrier piece herein is rectangular in shape for ease of manufacture and handling and for storage neatly in edge-to-edge relation with other design elements in a plurality of rows on a catalog page. This is not essential, however, as irregular shapes may be used as well. The illustrative page shown in FIG. 5 carries five horizontal or transverse rows of four design elements each, the designs on this page being upholstered chairs. It will be seen that all of the design elements together make up an outer layer of plastic film that is the same size and shape as the backing sheet 62.

This is the result of the preferred manufacturing process, in which the pages 20 are laid up in laminated form as shown in FIG. 7, with the large sheet of unprinted transparent static-cling film overlaid on the backing sheet 61 after printing of the designs on the underlying backing sheet. The static-cling film then is printed and cut to divide it into the individual carrier pieces 60, each with a design printed on it. This can be done by die-cutting, of the type called "kiss cutting", to sever only the outer layer of static-cling plastic. The plastic face 62 on the backing sheet is secured to the printed sheet by a transparent adhesive (not shown), so it would do no serious harm if the die-cutting should inadvertently penetrate into the plastic face.

As indicated in the lower right-hand corner of the sheet shown in FIG. 5, the designs printed on the backing sheet 61 preferably are identical to the designs printed on the carrier sheets 60, so that there is full registration when the carrier sheet is in place. For contrast when a design has been removed, however, it is desirable that the backing sheet design be noticeably different, herein lighter, than the design on the carrier sheet, as shown in FIG. 5, thereby facilitating location of the proper position for return of the carrier sheet to the catalog page after use. Also, as can be seen most clearly on FIGS. 5 and 6, the catalog page number for storage of each piece is indicated inconspicuously on the design piece to assist in the return of the piece to its storage position, Additional detailed features are shown in FIG. 5, including the special symbols 63 (square), 64 (diamond), 65 (circle) and 66 (star) for indicating contemporary, informal (country), formal and transitional styles, respectively, and the short verbal labels also provided with each design element. These are printed on the backing sheet 61 to assist in the selection process, but not on the carrier sheets 60, to avoid clutter on the finished interior design on the display panel 12.

FIG. 6 shows the reverse side of the design element 60 shown removed from the lower right-hand corner of the catalog page in FIG. 5. This is a rear perspective view of a chair, facing to the left. It can be seen that this design element can be reversed by turning it over to provide a rear perspective of the chair facing to the right, and thus can serve two different purposes or positions, lending greater versatility to the system. To enable this and other perspective design elements to be used reversibly, the designs on the carrier 60 elements preferably are printed in multiple layers—a first layer as a black outline directly on the film, a second as an opaque layer for the body of the design, and a third as another black outline on top of the opaque layer. This is illustrated schematically by the three layer lines 67, 68 and 69, shown in FIG. 7. Printed in this way, the designs have the same appearance whether viewed from the top or from the underside, even though the printing is all on one side.

Also shown in FIG. 5 are three punched holes 70 along the left-hand margin of the page, for use in mounting the hard copy catalog page in the binder 11, which is of the three-ring type, with a page number at 71 on the lower portion of the page printed on the backing sheet 61 to show through the transparent face sheet 62 and the carrier sheet 60. The page shown in FIG. 5 is page 49 of a set, carrying, as is evident, several different styles of upholstered chair designs.

Figures 8, 9:
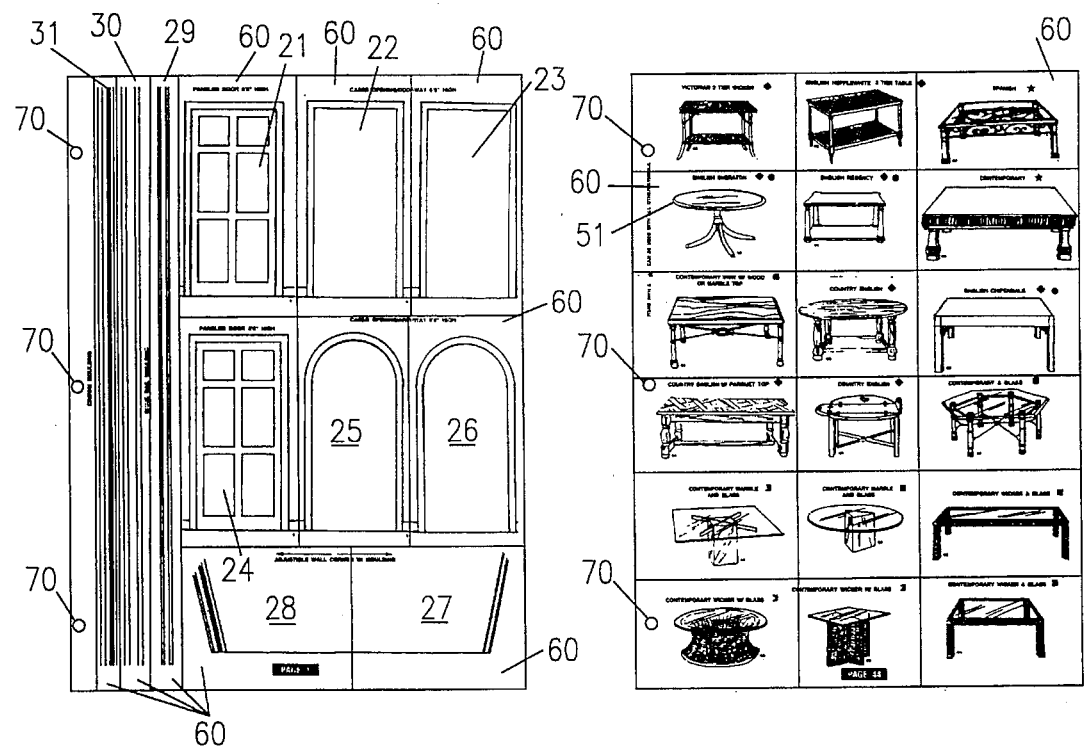
FIG. 8 is an enlarged plan view of the top page of design elements shown in FIG. 1.
FIG. 9 is a view similar to FIG. 8 showing another representative page of design elements.

Shown in FIGS. 8 and 9 are two other representative catalog pages of the set, marked as pages 1 and 44. Page 1 (FIG. 8) also is shown generally in FIG. 1 and contains a number of basic architectural elements, including the crown moulding and chair rail moulding also shown in FIG. 2; baseboard moulding 30; two paneled doors 21 and 24; two cased-opening rectangular doorways 22 and 23; and two-cased opening archways 25 and 26. At the bottom of the page are two adjustable wall corners with mouldings 27 and 28. Each of these design elements is printed on a rectangular carrier sheet dimensioned to accommodate the design of a size and shape adapted to hold the design element and preferably is die-cut from a single sheet of static-cling film, as previously described.

Figure 2:
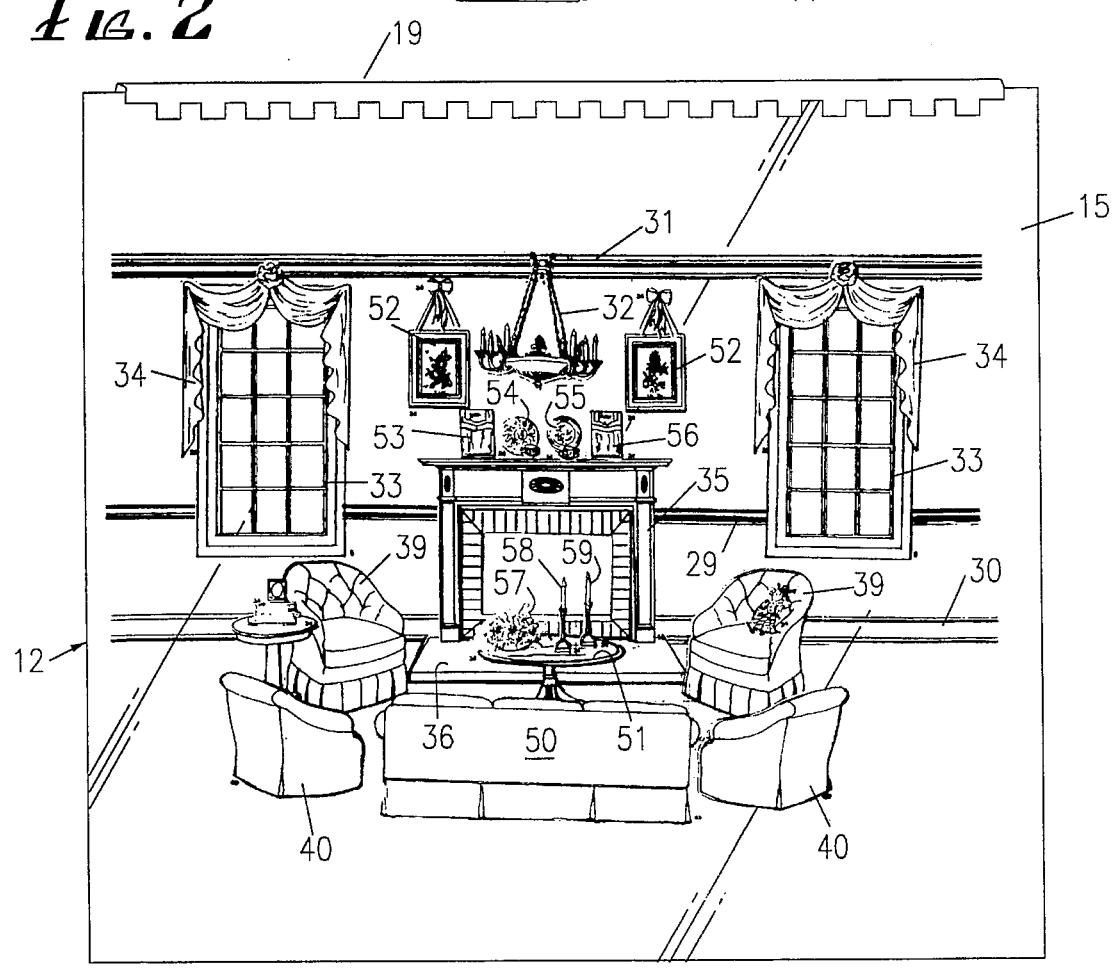
FIG. 2 is a plan view on an enlarged scale of the display assembly shown in FIG. 1, separated from the notebook binder and positioned with the template sheet in its storage position and with a selected group of design elements applied to layers of the display panel to create a representative interior design.

Similarly, the catalog page 44 shown in FIG. 9 contains six transverse rows with three table designs in each row, for a total of eighteen different designs of tables. The table 51 used in FIG. 2 is on the carrier sheet 60 at the left-hand end of the second row from the top. Both catalog pages shown in FIGS. 8 and 9 also have holes 70 for securing the pages in the binder 11.

As shown in detail in FIGS. 2, 3 and 4, the illustrative display assembly 12 has three rectangular transparent sheets 13, 14 and 15 making up the layers of the display panel, these layers being hinged together by means of a conventional binder strip of plastic or metal connecting in slots along corresponding edges of the sheets. The plain backing sheet 17 also is rectangular and is hingedly joined to the display sheets by the plastic binder, and the template sheet 18 is hingedly joined at 72 to another edge of the plain sheet 17. The two background sheets preferably are formed as one integral sheet of relatively stiff paper board, and the hinge is of the so-called "bump score" type, which simply forms a "bend" line across the board. This permits the template sheet 18 to swing into and out of the active position shown in FIGS. 2 and 3 from a storage position behind the plain sheet 17. In some instances, the display assembly will be separately packaged, for convenience, rather than being stored in the binder 11.

Various materials may be used for the elements of the "hard copy" of the system, the important characteristics being the transparency of the layers 13 to 15 of the film 60 and of the clear plastic face sheet 62 of the catalog pages, and the releasable engagement characteristic of the static cling carrier sheets in cooperation with the layers and the face sheets. Suitable materials for the layers 13 to 15 include clear flexible plastic polyester of the type sold as "Mylar" by DuPont, and the catalog sheets may be composed of printed "ten point" paper with thin face sheets of polyester "Mylar" plastic adhesively secured thereto after the images have been imprinted. The background sheets 17 and 18 may be relatively heavy paper "board".

While the method or procedure for using the hard copy version of the interior design system of the present invention in creating an interior design should be evident from the foregoing description of the elements of the invention, a step-by-step description of the use and operation of the invention in producing the representative design of FIG. 2 may be of assistance in this respect. With reference to FIGS. 3 and 4, it will be seen that the template sheet 18 is hinged on one side edge of the plain background sheet 17 of the display assembly 12, preferably by an integral fold which permits the template sheet to be swung into the operative position beneath the transparent layers 13, 14 and 15 as shown in FIG. 4, before any designs are applied to the display panel. In this position, the template serves as a guide for setting up the architectural elements of the room to be decorated. Those elements are found in the pages of the catalog carrying a full complement of such elements, and are transferred manually from the catalog pages to the display panel.

In this case, the architectural elements defining the wall of the room are applied to the first transparent layer 13 of the display panel 12 directly over the template sheet 18. The baseboard moulding 30 is applied along the base of the template scale for the wall area, designated on the grid as a wall line, just above the perspective scale for the foreground, which preferably is labeled as such. The other pre-existing architectural elements are overlaid on the first transparent layer 13 in accordance with the measurements that have been taken from the room.

In this instance, the design elements for the two chairs 39 and two tables, which are to have positions relatively close to the wall, also are applied to the first transparent layer 13. These can be placed according to pre-existing measurements indicated on the template sheet 18, or can be placed simply according to "feel" or "taste". In fact, it is possible to move pieces at will to different representative positions in the room space, and also to change designs, if the initial selection is not satisfactory. It will be seen that the picture elements 52 and the accessories 53–59 also are applied to the first transparent layer 13 over the template sheet 18.

After the selected design elements are in place on the first layer 13, the second layer 14 is moved into position over the first layer so that additional elements can be added to the interior design for the representative room. These may be the elements farther away from the wall, as shown—the couch 50 and the chairs 40—and also may include the draperies 34 and the light fixture 32. A great deal of freedom is available in use of the various layers. It will be seen that the perspective "foreground" scale on the template provides guidance to the designer for placement of the design elements that are farther away from the wall. The progressively increasing spacing of the "foreground" scale lines produces a realistic appearance to the resulting design.

When all of the elements are in place on the second transparent layer 14, the appearance will be as seen in FIG. 4. At this stage, the two layers 13 and 14 may be lifted to permit removal of the template sheet 18, by swinging it back to be behind the plain background sheet 17, which produces the uncluttered appearance seen in FIG. 2. It will be noted in FIG. 3 that a third transparent layer 15 is provided as part of the display assembly 12, and has not been used in laying out the interior design. While this layer also may be used to hold design elements, its primary purpose is, instead, to receive coloring media—from crayons, watercolors or other coloring media—to provide color to the interior design. For this purpose, the third layer 15 should be provided with an outside surface suitable for decorating in these fashions, preferably having a coating that will accept and hold crayon wax, and water colors. With this capability, even a person who is not an accomplished graphic artist can produce and display a color scheme for an interior design project. This adds yet another dimension to the capabilities of the interior design system of the present invention. Of course, photocopies also can be made and decorated with colors and the like.

As will be evident to those skilled in the art, the method of the invention may be practiced both with the hard copy version of the invention and using other media. For example, the scale images of the design elements, both the furniture and accessories elements and the architectural elements, may be stored in an electronic data base, and retrieved and displayed using conventional data storage and retrieval techniques well known to those skilled in this art. In this manner, with the background and foreground grids displayed on a screen [not shown], architectural elements for representing the room space to be decorated may be selected from the available stored collections, and transferred to the screen and positioned as desired. The furniture and accessory design elements then may be selected, also from the available stored collections, transferred to the screen and positioned thereon as desired. The capabilities of electronic storage, retrieval and manipulation of images makes it possible to increase the versatility of the invention in such a medium.

From the foregoing, it will be seen that the present invention provides a new and greatly improved system for assisting in creating, coordinating and rendering an interior design, providing a very useful and effective display assembly and a highly effective and sophisticated, comprehensive catalog of design elements for use in interior designs. It also will be apparent that, while a specific embodiment of the invention has been illustrated and described, and representative methods of practicing the invention have been described, various modifications and changes may be made by those skilled in the art without departing from the spirit and scope of the invention.

I claim as my invention:

1. For use in an interior design system, a sheet of design pieces comprising:

a backing sheet having a relatively stiff body, and a plastic face on said body;

a plurality of individual design pieces each comprising a transparent carrier sheet composed of clear static cling vinyl and bearing a print of a decorating article, each of said design pieces being substantially larger than the print on the carrier sheet, and overlying said face, said carrier sheets being edge-to-edge sections of a single sheet corresponding in size and shape to the size and shape of the backing sheet and separated from each other along lines cut in said single sheet;

said face and said transparent carrier sheets providing interactive means for holding the design pieces removably on the backing sheet, whereby the design pieces are stored in a preselected pattern on said backing sheet for removal and replacement on the backing sheet.

2. A sheet of design pieces as defined in claim 1 wherein said face of said backing sheet is composed of transparent material, and an additional set of prints corresponding to said prints on said carrier sheets is imprinted on the backing sheet beneath said face to indicate the proper positions of the carrier sheets.

3. A sheet of design pieces as defined in claim 1 wherein said transparent carrier sheets comprise rectangular sheets of uniform size arranged in edge-to-edge relation in a plurality of rows extending across said backing sheet.

4. A sheet of design pieces as defined in claim 2 wherein said backing sheet has a generally rectangular body of relatively stiff paper imprinted with said additional set of prints in a plurality of rows and covered with transparent plastic forming said face, and said carrier sheets comprise. rectangular sheets of transparent static-cling plastic arranged edge-to-edge in rows covering the rows of said first prints.

5. A sheet of design pieces as defined in claim 2 wherein said decorating articles on said backing sheet comprise designs of furniture articles and accesories articles, and further including with the designs of furniture articles and accessory articles a plurality of predetermined code designations corresponding to the decorating styles of the furniture and accessory articles.

6. A sheet of design pieces as defined in claim 5 wherein said plurality of different code designations identify the styles "informal or country," "formal", and "transitional," a different distinctive code designation being applied for each such style.

7. A sheet of design pieces as defined in claim 6 wherein each distinctive code is a symbol having a distinctive shape.

8. A sheet of design pieces as defined in claim 6 wherein each symbol also has a distinctive color.

9. A sheet of design pieces as defined in claim 5 further including verbal descriptive designations with said decorating articles on said backing sheet.

10. A sheet of design pieces as defined in claim 2 wherein said backing sheet has a specific identifying number, and the same number is applied visibly but inconspicuously to the carrier sheet of each of the design pieces.

11. A sheet of design pieces as defined in claim 2 wherein the prints on said backing sheet and the corresponding prints on said carrier sheets are of the same scale, but are visually different to assist in returning the carrier sheets to their positions on the backing sheet.

12. A sheet of design pieces as defined in claim 11 wherein the prints on said backing sheet are perceptibly lighter than the corresponding prints on the carrier sheets to produce the visual difference.

13. For use in an interior design system, a design assembly comprising:

a display panel comprising at least two layers of transparent sheet material;

a movable template board normally disposed in an active position behind said display panel and having imprinted thereon a scale grid for representing in elevation a wall area of a room to be the subject of an interior design and a space for representing in perspective a floor area as foreground of a room;

a plurality of design pieces each comprising a carrier sheet of flexible transparent film, said carrier sheets bearing prints of decorating articles and architectural elements represented to said scale and adapted to be overlaid on the different layers of said display panel and selectively positioned thereon in accordance with said grid and said foreground while said template board is in said active position behind said panel;

a background board approximately the same size and shape as said template board and normally disposed behind said template board when the latter is in said active position, for providing a template-free background for the display panel when the template board is moved out of the active position;

means forming a first hinge between one side of said background board and the layers of said display panel for swinging of the layers of the display panel individually into and out of positions overlying said background board; and means forming a second hinge between another side of said background board and said template board for swinging of the latter into and out of said active position behind said display panel.

14. A design assembly as defined in claim 13 wherein said layers are flexible plastic sheets and said film is static-cling plastic.

15. A design assembly as defined in claim 14 wherein a plurality of design pieces are overlaid on the first layer of said transparent sheet material and another plurality of design pieces are overlaid on a second layer.

16. A design assembly as defined in claim 14 wherein said display panel has an additional outer layer that has a coating for receiving and holding coloring material.

17. A design assembly as defined in claim 13 further including a plurality of pages of alternatively usable design pieces, each page comprising a backing sheet having a plurality of said design pieces overlaid on and releasably secured to said backing sheet with carrier sheets of the design pieces arranged in edge-to-edge relation and constituting parts of a sheet of said transparent film generally corresponding in size and shape to the backing sheet.

18. A design assembly as defined in claim 17 wherein each of said backing sheets comprises a sheet of relatively stiff paper having a transparent plastic face, and a plurality of designs imprinted on said paper in positions corresponding to the designs on the transparent film.

19. A design assembly as defined in claim 17 wherein said alternatively usable design pieces include different designs falling within the contemporary, informal or country, formal and transitional styles, and further including distinctive code symbols applied to said backing sheet and visible through the design pieces thereon.

20. A design assembly as defined in claim 17 wherein prints on said backing sheet and the corresponding prints on said carrier sheets are of the same scale, but are visually different to assist in returning the carrier sheets to their positions on the backing sheet.

21. The method of creating an interior design, comprising the steps of:

providing a design assembly including a scale template having a background portion representing a room wall in elevation and a foreground portion representing the room foreground in perspective, and also having a plurality of transparent overlay sheets positionable over the template;

providing a first collection of scale images of architectural design elements for representing a room space;

providing a second collection of scale images of furniture and accessory design elements for furnishing a room space;

selecting one or more images from said first collection and creating an architectural representation of a room space by applying the same over the background portion of the template;

and selecting a plurality of images from said second collection and applying them to said architectural representation and to the foreground portion of the template by applying them to another of said overlay sheets overlying the template, thereby to furnish and decorate the room space.

22. The method of claim 21 including the further step of removing the template from beneath the overlay sheets and placing a plain background sheet beneath the overlay sheets.

23. The method of claim 21 further including the step of providing design elements falling within different style groups, and further including the step of providing for each style group a distinctive code symbol and applying that code symbol to the design in the catalog.

24. The method of claim 23 wherein the style groups are contemporary, informal or country, formal and transitional, and including the marking of different code symbols to the designs falling within the different groups.

25. For use in an interior design system, a design assembly comprising:

a display panel comprising at least two layers of transparent sheet material;

a movable template board normally disposed in an active position behind said display panel and having imprinted thereon a scale grid for representing in elevation a wall area of a room to be the subject of an interior design and in perspective a floor area as foreground of a room;

a background board approximately the same size and shape as said template board and normally disposed behind the template board, for providing a template-free background for the display panel after removal of the template board;

means forming first hinges between said background board and the layers of said display panel for swinging of the layers individually into and out of positions overlying said template board and said background board, said first hinges connecting one side of each layer to a side of said background board; and means forming a second hinge between said background board and said template board along a side of the background board remote from said first hinges for swinging of the template board into and out of position overlying said background board and beneath said layers and into a stored position behind the background board.

26. An interior design system for creating a design for a room space, comprising:

a design assembly having a display panel comprising at least two layers of flexible transparent material, a template board normally positioned in an active position behind said display panel and having imprinted thereon means for representing in elevation a wall area of a room to be the subject of an interior design and in perspective a floor area of the room, a background board approximately the same size and shape as said template board and normally disposed behind the latter for providing a template-free background for the display panel when the template board is removed from said active position, means forming a first hinge between said two layers and one side of said background board for swinging of the layers individually into and out of overlying relation with the background board, and means forming a second hinge between said template board and a different side of the background board for selective swinging of the template board away from the background board and out of the active position into a stored position behind the background board;

a catalog of design pieces having a plurality of catalog pages of alternatively usable design pieces, each page comprising a backing sheet of relatively stiff paper having a face, and a sheet of transparent film of clear static cling material of approximately the same size and shape as the backing sheet, said film being cut and divided into a plurality of edge-to-edge design pieces each comprising a carrier sheet of the film bearing a print of a decorating element smaller than the carrier sheet and represented to scale, some of said carrier sheets bearing prints of architectural elements for representing a room space on one or more of said transparent layers and others bearing prints of furnishings for furnishing the room space on one or more of said transparent layers;

and means for holding said catalog pages together in assembled condition as a catalog and for holding and storing said display panel in the catalog.

27. An improved design system as defined in claim 26 wherein said carrier sheets of each page are rectangular portions of a single sheet and are formed by cut lines in the sheet.

28. An improved design system as defined in claim 26 wherein said means for holding said catalog pages is a ring-type notebook having a pocket receiving said display panel, said catalog pages having ring holes along corresponding sides.

29. An improved design system as defined in claim 26 wherein said display panel includes an outer flexible transparent layer having a coating for receiving and holding coloring material.

30. An improved design system as defined in claim 26 wherein at least some of said designs imprinted on said clear film have a first layer as a dark line representation and outline, a second layer of opaque filler overlying said first layer and filling said outline, and a third layer of dark line representation and outline over the opaque layer, whereby the dark line representation and outline are visible from the reverse side of the film.

31. An improved design system as defined in claim 26 wherein said carrier sheets are imprinted with symbols selected from a group of arbitrary symbols representing different style groups, whereby matching of symbols is an indication of matching styles of designs.

32. For use in a design system comprising a template for representing a room space and a plurality of design pieces to be arranged over the template to create a design for a room space, an improved design piece, comprising:

a carrier sheet of clear plastic material;

a representation of a design printed on one side of said carrier sheet and having a first layer constituting a first line representation and outline of the design applied directly to the sheet, an opaque second layer overlying and filling the first line representation and outline and constituting a body of the design, and a third layer constituting a repeat of said first line representation and outline applied over said second layer and aligned with the first layer, whereby the carrier sheet is reversible and has the same but reversed appearance from both sides.

\* \* \* \* \*